United States Patent
Hammond et al.

(10) Patent No.: US 9,878,484 B2
(45) Date of Patent: Jan. 30, 2018

(54) HORIZONTAL INTERMITTENT MOTION THERMOFORMING MACHINE

(71) Applicant: RECKITT BENCKISER (UK) LIMITED, Slough (GB)

(72) Inventors: Geoffrey Robert Hammond, Hull (GB); Richard Rogers, Norfolk (GB)

(73) Assignee: Reckitt Benckiser (UK) Limited, Slough (GB)

(*) Notice: Subject to any disclaimer, the term of this patent is extended or adjusted under 35 U.S.C. 154(b) by 0 days.

(21) Appl. No.: 14/090,805

(22) Filed: Nov. 26, 2013

(65) Prior Publication Data
US 2014/0154350 A1 Jun. 5, 2014

Related U.S. Application Data

(60) Division of application No. 13/711,244, filed on Dec. 11, 2012, now abandoned, which is a continuation of
(Continued)

(30) Foreign Application Priority Data

Aug. 25, 2000 (GB) .................................. 0020964.3

(51) Int. Cl.
*B29C 51/26* (2006.01)
*B29C 51/30* (2006.01)
(Continued)

(52) U.S. Cl.
CPC ............ *B29C 51/261* (2013.01); *B29C 51/18* (2013.01); *B29C 51/30* (2013.01); *B32B 1/02* (2013.01);
(Continued)

(58) Field of Classification Search
CPC B65B 9/042; B65B 9/04; B65B 47/02; B65B 11/50; B65B 47/10; B65B 51/10;
(Continued)

(56) References Cited

U.S. PATENT DOCUMENTS

T946,002 I4    5/1976  Berkebile
3,995,763 A   12/1976  Ayres et al.
(Continued)

FOREIGN PATENT DOCUMENTS

CA    1112534 A1    11/1981
EP    0524721 A1     1/1993
(Continued)

OTHER PUBLICATIONS

"Design for Manufacturability Handbook", Second Edition, James Braila, McGraw-Hill, Published 1999, pp. 6.109-6.117.

*Primary Examiner* — Matthew Daniels
*Assistant Examiner* — Leith S Shafi
(74) *Attorney, Agent, or Firm* — Troutman Sanders LLP; Ryan Schneider; Chris Davis

(57) ABSTRACT

The disclosure describes a thermoforming machine, which can include a horizontal intermittent motion thermoforming machine, and a mold, wherein the mold contains a plurality of pocket forming cavities in a 2-dimensional array. These cavities can each be defined by side walls and a base, and each cavity can be surrounded by a planar surface of the mold on all sides. Further, the cavities can be positioned in the array so as to provide a plurality of continuous strips of uninterrupted planar surface of the mold from a leading to a trailing edge of the mold. These cavities can have rounded bottom corners, formed where the side walls meet the base, and rounded edges, formed where side walls meet an upper
(Continued)

surface of the mold. The thermoforming machine can be further configured to be able to draw a web of water-soluble film down into the cavities.

5 Claims, 4 Drawing Sheets

Related U.S. Application Data application No. 12/845,197, filed on Jul. 28, 2010, now abandoned, which is a division of application No. 10/362,615, filed as application No. PCT/GB01/03826 on Aug. 23, 2001, now Pat. No. 7,797,912.

(51) Int. Cl.
| | | |
|---|---|---|
| *B65B 9/04* | (2006.01) | |
| *B65B 47/02* | (2006.01) | |
| *B29C 51/18* | (2006.01) | |
| *B32B 1/02* | (2006.01) | |
| *B29C 51/00* | (2006.01) | |

(52) U.S. Cl.
CPC .............. *B65B 9/042* (2013.01); *B65B 47/02* (2013.01); *B29C 51/002* (2013.01); *B29K 2995/0059* (2013.01); *B29K 2995/0062* (2013.01); *Y10T 428/1352* (2015.01)

(58) Field of Classification Search
CPC ... B29C 51/002; B29C 51/10; B29C 47/0054; B29C 51/04; B29C 51/18; B29C 51/30
USPC .... 249/60, 69, 117, 119, 129; 425/183, 193, 425/195, 387.1, 388, 400, 405.1; 264/101, 292, 294, 297.1, 297.8, 299, 264/320, 553, 554; 53/453, 558, 578, 53/574
See application file for complete search history.

(56) References Cited

U.S. PATENT DOCUMENTS

| | | | |
|---|---|---|---|
| 4,230,662 A | 10/1980 | Barnsbee | |
| 4,349,997 A | 9/1982 | Hayasaka et al. | |
| 4,439,389 A | 3/1984 | Hasenauer | |
| 4,495,135 A | 1/1985 | White | |
| 4,506,495 A | 3/1985 | Romagnoli | |
| 4,740,342 A | 4/1988 | Menard et al. | |
| 4,900,385 A | 2/1990 | Ochi et al. | |
| 4,938,001 A | 7/1990 | Vico | |
| 4,971,748 A | 11/1990 | Sado et al. | |
| 5,401,456 A * | 3/1995 | Alesi, Jr. ............... | B29C 44/569 156/245 |
| 5,500,067 A * | 3/1996 | Jenkner ................ | A43B 13/187 156/145 |
| 5,649,438 A | 7/1997 | Hall et al. | |
| 5,658,603 A | 8/1997 | Andersen et al. | |
| 5,709,827 A | 1/1998 | Andersen et al. | |
| 5,879,612 A * | 3/1999 | Zeiter et al. .................. | 264/292 |
| 5,958,326 A | 9/1999 | Caferro | |
| 6,224,905 B1 | 5/2001 | Lawrence et al. | |
| 6,378,274 B1 * | 4/2002 | Harbour .................. | B65B 47/02 53/427 |
| 6,479,448 B2 | 11/2002 | Cropper et al. | |
| 6,554,944 B1 | 4/2003 | Peters et al. | |
| 7,797,912 B2 | 9/2010 | Hammond et al. | |
| 2008/0179785 A1 | 7/2008 | Hammond et al. | |

FOREIGN PATENT DOCUMENTS

| | | |
|---|---|---|
| EP | 0654418 A1 | 5/1995 |
| GB | 2362868 A | 12/2001 |
| WO | 8912587 A1 | 12/1989 |
| WO | 9217382 A1 | 10/1992 |
| WO | 9308095 A1 | 4/1993 |
| WO | 9414941 A1 | 7/1994 |

* cited by examiner

HORIZONTAL INTERMITTENT MOTION THERMOFORMING MACHINE

CROSS-REFERENCE TO RELATED APPLICATIONS

This application is a Divisional Application of Ser. No. 13/711,244 filed Dec. 11, 2012, which is a Continuation Application of Ser. No. 12/845,197 filed Jul. 28, 2010, which is a Divisional Application of Ser. No. 10/362,615 filed Nov. 29, 2004, now U.S. Pat. No. 7,797,912, which is a 35 U.S.C. 371 application of PCT/GB01/003826 filed Aug. 23, 2001, which claims priority to the Great Britain application 0020964.3 filed Aug. 25, 2000, all of which are hereby incorporated by reference as if fully set forth herein.

The present invention relates to a method of manufacturing water-soluble containers and a mould for use therein.

It is known to package chemical compositions which may be of a hazardous or irritant nature in water soluble or water dispersible materials such as films. The package can simply be added to water in order to dissolve or disperse the contents of the package into the water.

For example, WO 89/12587 discloses a package which comprises an envelope of a water soluble or water dispersible material which comprises a flexible wall and a water-soluble or water-dispersible heat seal. The package may contain an organic liquid comprising, for example, a pesticide, fungicide, insecticide or herbicide.

It is also known to package detergents in water-soluble or water-dispersible containers. For example, WO 94/14941 discloses a water-soluble or water-dispersible capsule containing an aqueous dishwasher detergent. The capsule is made of gelatin.

CA-A-1,112,534 discloses a packet made of a water-soluble material in film form enclosing within it a paste-form, automatic dishwasher-compatible detergent composition. The water-soluble material may be, for example, polyvinyl alcohol, polyethylene oxide or methyl cellulose. Example 1 illustrates an embodiment wherein a poly(vinyl alcohol) (PVOH) film is made into a 5 cm square packet by heat sealing its edges, and the packet is filled with a composition which contains 8.5 wt. % water.

In fields such as detergents for domestic use, an attractive appearance for an article is extremely desirable. However in the prior art, such as that described above, a bag is simply formed from a single sheet of water-soluble film. The film is folded and the edges heat-sealed to form the bag. The bag is then filled and heat-sealed. This produces a rather flat, limp envelope containing the product. Furthermore there may be a lack of uniformity between different bags because of their flexible nature.

We have discovered that this type of product is not deemed to be attractive by an average consumer.

It is known to form water-soluble containers by thermoforming a water-soluble material. For example, WO 92/17382 discloses a package containing an agrochemical such as a pesticide comprising a first sheet of non-planar water-soluble or water-dispersible material and a second sheet of water-soluble or water-dispersible material superposed on the first sheet and sealed to it by a continuous closed water-soluble or water-dispersible seal along a continuous region of the superposed sheets. It is stated to be advantageous to ensure that the package produced is evacuated of air or the contents are under reduced pressure to provide increased resistance to shock. Furthermore, when the package contains a liquid, the liquid must be an organic liquid which must be reasonably dry and typically contains less than 2 to 3% of water to ensure that it does not attack the water-soluble package and cause leakage.

EP-A-654,418 describes self-standing flexible pouches which may contain, for example, liquid detergent compositions for refilling other containers. In order to avoid folding of the pouch, which can lead to cracking and leakage, the bag is inflated before it is sealed.

In order to improve the strength of packages containing liquids, it is also known to provide the package with residual inflatability. Thus, for example, EP-A-524,721 describes a water-soluble package which contains a liquid, wherein the package is inflatable to a volume which is greater than the initial volume of the package. Thus the package is filled to less than its complete capacity, and the unused capacity may be partially, but not totally, filled with a gas such as air. The unused capacity which does not contain gas provides the residual inflatability.

We have now surprisingly discovered a water-soluble container which contains a liquid composition can be given an attractive three-dimensional appearance by using a thermoforming technique, such as that disclosed in WO 92/17382, on a PVOH film and ensuring that the liquid composition has a reasonably large water content of at least 3 wt % free water, based on the weight of the aqueous composition. Immediately after the containers are prepared, they have a limp, unattractive appearance. However, after storage for a short while, for example, from a few minutes to a few hours, they develop a more attractive three-dimensional appearance, and also appear to look fuller. They can also be said to have a "puffed-up" appearance. Although not bound by this theory, it is believed that the water in the aqueous composition shrinks the PVOH film around the liquid composition to provide the attractive appearance. In other words the PVOH film attempts to recover its original shape when contacted with the aqueous composition.

In our co-pending application entitled "Improvements in or Relating to Aqueous Compositions" we describe a process for producing a container as defined above which comprises the steps of:

a) thermoforming a first PVOH film to produce a pocket;
b) filling the pocket with the aqueous composition;
c) placing a second PVOH film on top of the filled pocket; and
d) sealing the first film and second film together.

The method of forming the container is similar to the process described in WO 92/17382. A first PVOH film is initially thermoformed into a mould to produce a non-planar sheet containing a pocket, such as a recess, which is able to retain the aqueous composition. The pocket is generally bounded by a flange, which is preferably substantially planar. The pocket may have internal barrier layers as described in, for example, WO 93/08095. The pocket is then filled with the aqueous composition, and a second PVOH film is placed on the flange and across the pocket. The second PVOH film may or may not be thermoformed. The pocket may be completely filled, or only partly filled, for example to leave an air space of from 2 to 20%, especially from 5 to 10%, of the volume of the container immediately after it is formed. Partial filling may reduce the risk of rupture of the container if it is subjected to shock and reduce the risk of leakage if the container is subjected to high temperatures.

The films are then sealed together, for example by heat sealing across the flange. A suitable heat sealing temperature is, for example, 120° C. to 195° C., for example 140° C. to 150° C. A suitable sealing pressure is, for example, from 250 kPa to 800 kPa. Examples of sealing pressures are 276 kPa to 552 kPa (40 p.s.i. to 80 p.s.i.), especially 345 kPa to 483 kPa (50 p.s.i. to 70 p.s.i.) or 400 kPa to 800 kPa (4 to 8 bar), especially 500 kPa to 700 kPa (5 to 7 bar) depending on the heat sealing machine used. Suitable sealing dwell times are at least 0.4 seconds, for example 0.4 to 2.5 seconds. Other methods of sealing the films together may be used, for example infra-red, radio frequency, ultrasonic or laser solvent, vibration, electromagnetic, hot gas, hot plate, insert bonding, fraction sealing or spin welding. An adhesive such as water or an aqueous solution of PVOH may also be used. The adhesive can be applied to the films by spraying, transfer coating, roller coating or otherwise coating, or the films can be passed through a mist of the adhesive. The seal desirably is also water-soluble.

It is, however, extremely difficult to manufacture products using PVOH and other materials having similar physical characteristics, partly because of their hygroscopic nature, but mainly due to the fact that the material is very soft and floppy, making it extremely difficult to handle and cut. In most thermoforming, vacuum forming or other similar forming processes, the films used have a degree of strength and rigidity. Thus friction drives are generally, although not exclusively, used to support the films and to transport them through the machine during the process. PVOH and similar films do not have this strength or rigidity and would stretch, thin and tear if subjected to such handling.

Furthermore, thermo- and other such forming processes impose a significant amount of drawing and stretching of the material. As such the known method of thermoforming using PVOH materials utilises a single mould for each moulded product, with each PVOH film placed manually over each mould. This means that the amount of material available for deforming is greater, but it is a very labour intensive, slow and therefore costly process to achieve the manufacture of this type of product.

We have discovered that standard horizontal intermittent motion thermoforming machines, such as those supplied by Multivac, Doyen and Tiromat, can be used to produce thermoformed containers from PVOH and films of a similar nature at normal production speeds. However, some modifications must be made to these machines, in particular to the drive system, in order to run such films at normal production speeds.

It is therefore an object of the present invention to provide an improvement in the process for manufacturing such containers, to enable a plurality of water-soluble containers to be formed simultaneously. A further objective is to provide a tool for use in a process for producing a plurality of water-soluble containers made from PVOH or other films of a similar physical nature or the like, at each stroke of an horizontal intermittent motion thermoforming machine. Yet another objective is to provide an improved process for producing multiple containers on a production scale.

The invention therefore provides a process for producing a water-soluble container using a horizontal intermittent motion thermoforming machine which comprises the steps of:

a) locating a first water-soluble film over a mould, said mould containing a plurality of pocket forming cavities, defined by side walls and a base, in a 2-dimensional array, each cavity being surrounded by a planar surface of the mould on all sides in which the shortest dimension of the planar surface between two adjacent cavities is at least 3 mm and between an edge of the mould and the closest cavity is at least 1.5 mm;

b) thermoforming the first film to produce a plurality of pockets;

c) at least partially filling the pockets with a composition; and d) sealing the plurality of the at least partially filled pockets, wherein in which the cavities are positioned in the array such that there are a plurality of continuous strips of uninterrupted planar surface of the mould from a leading to a trailing edge of the mould, for receiving support means fitted to the machine for supporting the film.

The invention further provides a mould for use in a thermoforming process for manufacturing water-soluble containers from water-soluble films, in which said mould contains a plurality of pocket forming cavities, defined by side walls and a base, in a 2-dimensional array, each cavity being surrounded by a planar surface of the mould on all sides in which the shortest dimension of the planar surface between two adjacent cavities is at least 3 mm and between an edge of the mould and the closest cavity is at least 1.5 mm, and in which the cavities are positioned in the array such that there are a plurality of continuous strips of uninterrupted planar surface of the mould from a leading to a trailing edge of the mould.

The invention will now be described, in further detail, by way of example only, with reference to and as shown in the accompanying drawings in which.

Figure 1:
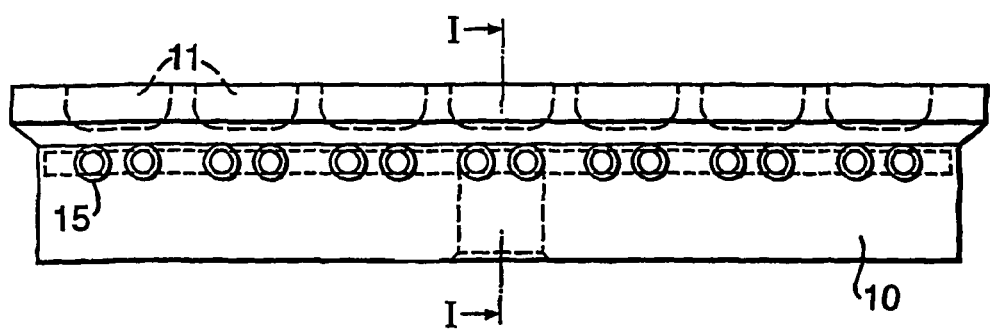
FIG. 1 is an end elevation of a mould used in the present invention.
Figure 2:
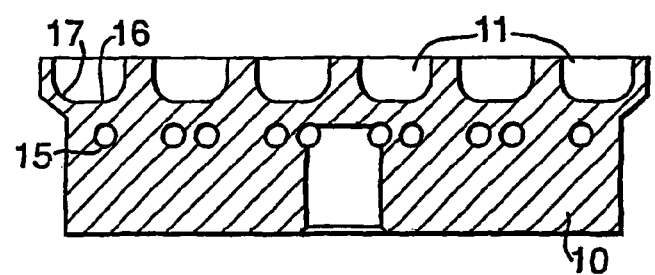
FIG. 2 is a side sectional elevation of the mould of FIG. 1 on the line I-I.
Figure 7:
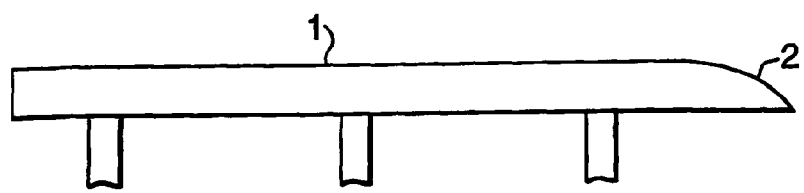
FIG. 7 is a schematic representation illustrating a support rail.

FIGS. 1 and 2 show a mould 10 used for thermoforming a plurality of containers from PVOH or films having similar physical characteristics on a horizontal intermittent thermoforming machine comprising a series of stations as shown in FIG. 7. These are the forming area 30, at which the film 31 is supplied from a reel to the moulds 10 and where the first thermoforming step takes place to form pockets; the filling station 32, at which the pockets are filled; the sealing station 33, to which a further film 34 is supplied to seal the pockets; the cooling station 35; and the cutting station 36 where the sealed containers are separated from each other by shear knives 38.

Each mould 10 comprises a 2-dimensional array of pocket forming cavities 11. Although the Figures illustrate a regular array of 6×7 cavities 11 to form 42 containers simultaneously, the number and relative positioning of the cavities 11 may be varied. Essentially the surface dimensions of the mould are determined by the width and draw of the machine on which it is to be used. The best arrangement of the individual cavities 11 is determined according to the following considerations.

Each cavity 11 must be surrounded by a planar surface 18 on all sides, to allow for subsequent sealing of the second film to the first films. This dimension should be at least 1.5 mm, but is preferably in the range of 2 mm to 5 mm. Thus the distance between any cavity and the edge of the mould 10 is at least 1.5 mm and the distance between any two cavities 11 is at least 3 mm. The maximum distance is obviously determined by the size of the mould 10, but in practice, for commercial reasons, the spacing would not normally exceed 15 mm.

As the materials used are very flexible, the web of film tends to sag. In order to enable all of the cavities 11 to be filled, support means must be fitted to the machine, from the end of the thermoforming station to the start of the filling station, and also preferably to the cutting station 36, to support the web of film. The support means may be provided by rails, bars, filaments, wires, rope, cable or the like. Most preferred are wires or rails. Where rails 1 are used, as shown in FIG. 7, the leading ends of the rails may have a smooth cam surface 2 for lifting the web. The support means can be intermittent or, more preferably, continuous.

Figure 8:
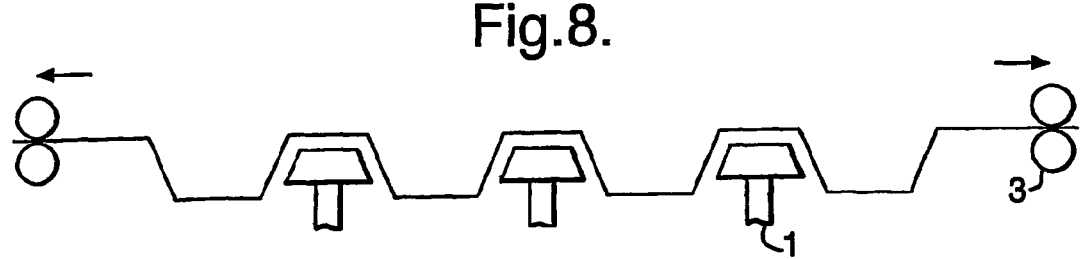
FIG. 8 shows support rails supporting a web of material on a horizontal intermittent thermoforming machine.

FIG. 8 shows how the web is drawn down from the thermoforming station by being held by grippers 3 which are pulled apart to provide some tension in the web. Too much tension will displace the thermoformed pockets. However, not enough tension is provided so that the web remains flat for filling. The support rails 1 maintain the web as a substantially flat surface. This places an extra constraint on the arrangement of the cavities within the space available i.e. there must be clear channels 21 (see arrows Z on FIG. 6) through the pattern of cavities 11 from the leading edge of the mould 10 to the trailing edge. It is preferred that these channels 21 are available between each cavity 11 (across the web i.e. on the leading edge), but this is not essential, depending on the number of cavities 11 across the leading edge. At least every other cavity should be supported.

Located in the mould 10 beneath the cavities 11 are air channels 15, which communicate with the cavities 11 via air bores 16. The number and positioning of the air bores 15 has an effect on how the film is drawn into the cavities 11 during the thermoforming process, and therefore consideration must be given to an appropriate arrangement of air bores depending on the specific configuration of the cavities 11 used. In particular they must be designed and arranged to effect the most even deformation of the film into the cavities 11. In a preferred embodiment the air bores 15 are located in the regions where the end and side walls 12, 13 of the cavities 11 join the cavity base 14. The holes are preferably of 0.1 mm to 1 mm diameter and more preferably 0.4 mm to 0.5 mm. Vacuum release bores 17 are drilled in the cavity bases 14.

Figure 3:
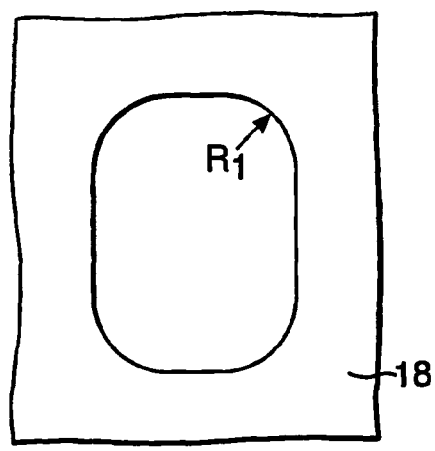
FIGS. 3 to 5 are respectively plan views and cross sectional side elevations of a section of the mould of FIG. 1 showing the dimensions of the cavities.
Figure 4:
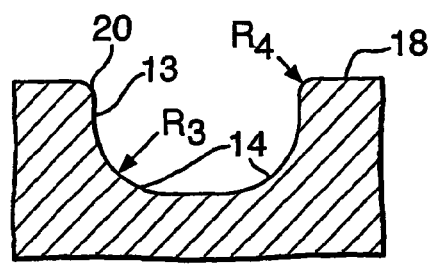
Figure 5:
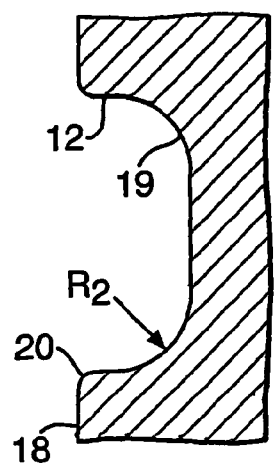

The shape of the cavities 11 is dictated partly by the intended use of the containers, but also by the processing constraints. A particularly convenient shape for an automatic dishwasher composition is illustrated in FIGS. 3 to 5. The dimensions of the cavities are determined by the required fill volume of the containers and any constraints resulting from the intended use of the containers. For example, if the containers are to be used as refill sachets for a trigger spray, the width of the containers, and therefore the cavities is determined by the diameter of the spray bottle neck. If the containers are to be used for a dishwasher product, all three dimensions are determined by the dispenser into which the containers will eventually be placed.

One particularly suitable embodiment which we have found for a dishwasher product has a rectangular cavity mouth, the dimensions of which are 29 mm×39 mm, with rounded corners, having a radius $R_1$ of, preferably, 10 mm.

Figure 6:
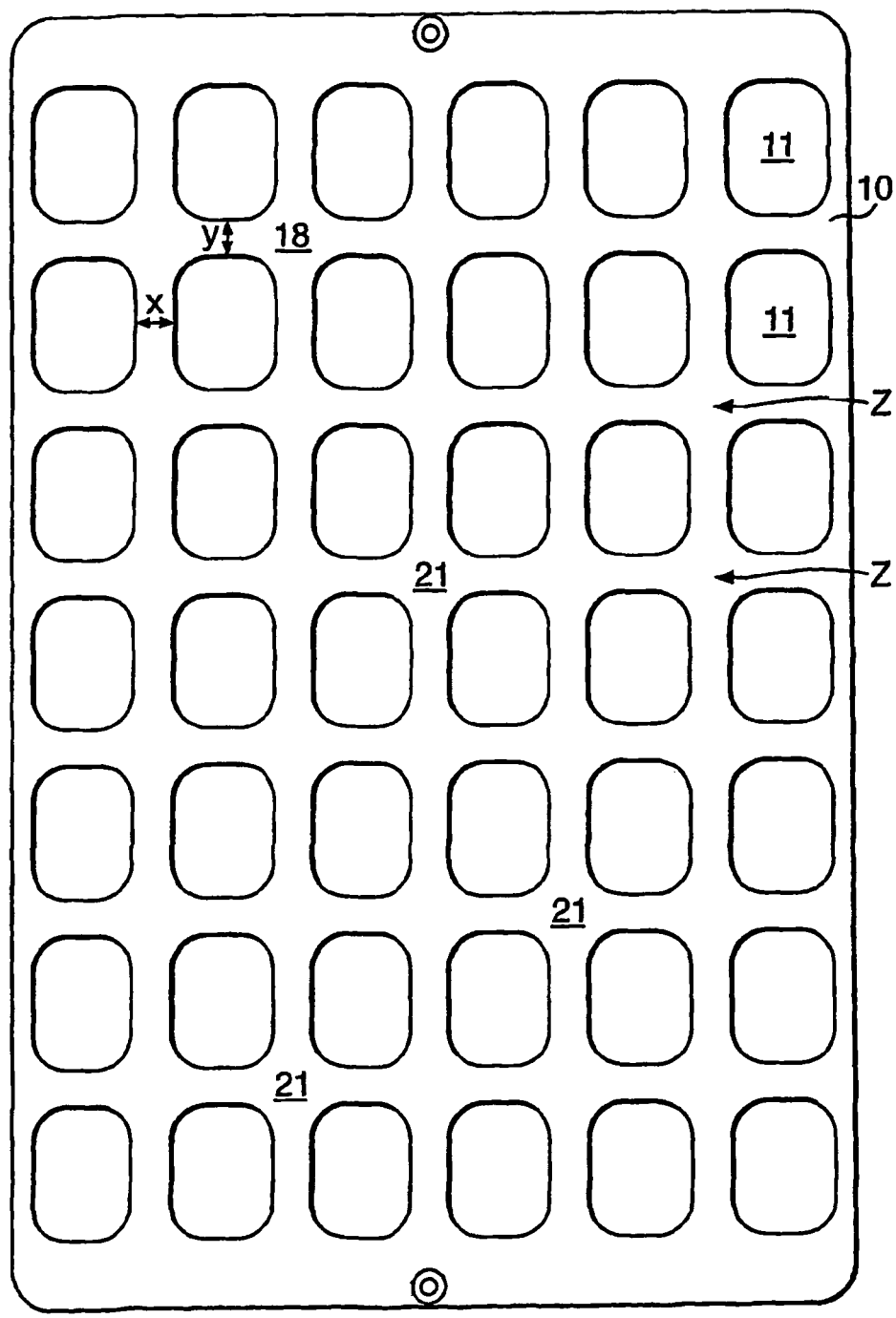
FIG. 6 is a plan view of the mould of FIG. 1.

The depth of the cavities depends partly on the area of the cavity mouth, to ensure that the film can be drawn down without over thinning and tearing. This can also be affected by the area of film available between adjacent cavities 11. Referring to FIG. 6, the upper surface 18 of the mould 10 can clearly be seen. The gaps between the cavities 11 are marked as dimensions X and Y in this particular layout. The ratio X:Y is desirably 1:2 to 2:1, preferably 1.5:1 to 1:1.5, most preferably about 1:1. X and Y are desirably from 5 to 13 mm, preferably 7 to 12 mm, preferably about 10 mm. The preferred depth is in the range of 10 to 80% of the shortest dimension of the cavity mouth, and more preferably in the range of 40 to 60%. A preferred depth of the cavities 11 where the mouth of the cavities 11 is 29 mm by 39 mm is 16 mm.

The corners 19 formed where the end and side walls 12, 13 of the cavities 11 join the cavity base 14, are preferably radiussed to avoid over thinning or tearing of the film, as it is drawn down the side walls 13 and the corners 19. The corners 19 preferably have a radius $R_2$ and $R_3$ of between 8 mm and 10 mm.

The cavity base 14 may be planar or rounded. Especially where a greater cavity depth is used, such as 18 mm or 19 mm, it may be preferable to have a rounded base 14 to prevent regions of thicker material from being drawn directly downward to the centre of the base 14. A suitable radius for the base 14, in particular where the cavity depth is 18 mm, is 20 mm. The use of a rounded base 14 means that the positioning and direction of the air bores 16 may be different from those used with flat-bottomed cavities 11. This changes the way in which the film is drawn into the cavities 11.

The edges 20, where the cavity end and side walls 12, 13 join the upper surface 18 of the mould 10, are preferably rounded to allow for a smooth movement of the film over the edges 20 during the thermoforming process, to minimise the risk of the film snagging or tearing. The radius $R_4$ is preferably small, e.g. 1 mm, as it is difficult to fill this area of the cavities 11 without risk of fouling the sealing area.

Another dimension which must be carefully controlled to enable the film to be drawn into the cavities 11 without tearing, is the spacing between the cavities 11. For cavities of the dimensions given above, it is preferred that the spacing between the cavities lies in the range of 9 mm to 16 mm.

The draft angle of the side walls 12, 13 is preferably 3° to 5° to assist in the release of the containers. However, for certain very soft materials, such as PVOH, draft angles may not be necessary.

The sizing of the mould 10, incorporating an array of cavities 11 in this manner, enables the film to be supported. The width of the web of film is determined by the width of the machine in which the mould is fitted. The mould is designed to fit the width of the machine with a suitable "overhang" of film, which can be used for transporting the film. It is suggested that small clips or grippers attached to a plurality of driven chains would enable the films to be transported appropriately. The grippers preferably toe-out to provide tension as the web of film moves through the machine.

A first PVOH film is thus positioned over the mould 10 and thermoformed in a known manner to form a plurality of pockets. The pockets are then filled with an aqueous or other composition and a second film brought into position over the plurality of pockets. The second film may be the same as the first film or another material and is heat, or otherwise sealed, to the parts of the first film remaining on the upper surface 18 of the mould, as described previously.

The filled containers may then be separated from each other. Alternatively, they may be left conjoined and, for example, perforations provided between the individual containers so that they can be separated easily at a later stage, for example by a consumer. If the containers are separated, the flanges may be left in place. However, desirably the flanges are reduced in order to provide an even more attractive, three-dimensional appearance. Generally the flanges remaining should be as small as possible for aesthetic purposes while bearing in mind that some flange is required to ensure the two films remain adhered to each other. A flange having a width of 1 mm to 10 mm is desirable, preferably 1.5 mm to 6 mm, most preferably about 5 mm.

For containers of compositions having a high water content, the containers may then be left for a while to attain their attractive appearance, or may be immediately packaged into boxes for retail sale, and left to attain their attractive appearance in the boxes. The containers may themselves be packaged in outer containers if desired, for example non-water soluble containers which are removed before the water-soluble containers are used.

If more than one film is used for the containers, the films may be identical or different. The film may be partially or fully alcoholised or hydrolysed, for example, it may be from 40 to 100%, preferably 70 to 92%, more preferably about 88% or about 92%, alcoholised or hydrolysed, polyvinyl acetate film. The degree of hydrolysis is known to influence the temperature at which the PVOH starts to dissolve in water. 88% hydrolysis corresponds to a film soluble in cold (i.e. room temperature) water, whereas 92% hydrolysis corresponds to a film soluble in warm water. An example of a preferred PVOH is ethoxylated PVOH. The film may be cast, blown or extruded. It may also be unorientated, monoaxially oriented or bi-axially oriented.

It is possible for suitable additives such as plasticisers, lubricants and colouring agents to be added to the film. Components which modify the properties of the polymer may also be added. Plasticisers are generally used in an amount of up to 20 wt %, for example, from 15 to 20 wt %. Lubricants are generally used in an amount of 0.5 to 5 wt %. The polymer is therefore generally used in an amount of from 75 to 84.5 wt %, based on the total number of the composition used to form the film. Suitable plasticisers are, for example, pentaerythritols such as depentaerythritol, sorbitol, mannitol, glycerine and glycols such as glycerol, ethylene glycol and polyethylene glycol. Solids such as talc, stearic acid, magnesium stearate, silicon dioxide, zince stearate or colloidal silica may also be used.

It is also possible to include one or more particulate solids in the films in order to accelerate the rate of dissolution of the container. This solid may also be present in the contents of the container. Dissolution of the solid in water is sufficient to cause an acceleration in the break-up of the container, particularly if a gas is generated, when the physical agitation caused may, for example, result in the virtually immediate release of the contents from the container. Examples of such solids are alkali or alkaline earth metal, such as sodium, potassium, magnesium or calcium, bicarbonate or carbonate, in conjunction with an acid. Suitable acids are, for example, acidic substances having carboxylic or sulfonic acid groups or salts thereof. Examples are cinnamic, tartaric, mandelic, fumaric, maleic, malic, palmoic, citric and naphthalene disulfonic acids.

The film is generally cold water (20° C.) soluble, but, depending on its degree of hydrolysis, may be insoluble in cold water at 20° C. and only become soluble in warm water or hot water having a temperature of, for example, 30° C., 40° C., 50° C. or even 60° C. If the film is soluble in cold water, or water at a temperature of up to say 35° C., steps must be taken to ensure that an aqueous composition contained inside the container does not dissolve the film from the inside. Steps may be taken to treat the inside surface of the film, for example by coating it with a semi-permeable or partial water barrier such as polyethylene or polypropylene or a hydrogel such as a polyacrylate. This coating will simply fall apart or dissolve or disperse into microscopic particles when the container is dissolved in water. Steps may also be taken to adapt the composition to ensure that it does not dissolve the film. For example, it has been found that ensuring the composition has a high ionic strength or contains an agent which minimises water loss through the walls of the container will prevent the composition from dissolving the PVOH film from the inside. This is described in more detail in EP-A-518,689 and WO 97/27743.

It is particularly important to avoid pinholes in the film through which leakage of the contained composition may occur. It may therefore be appropriate to use a laminate of two or more layers of a different or the same film, as pinholes are unlikely to coincide in two layers of material.

When first and second films are used to form the containers of the present invention, the first film will generally have a thickness before thermoforming of 20 to 500 μm, especially 70 to 400 μm, for example 70 to 300 μm or 90 or 110 to 150 μm. The thickness of the second PVOH film may be less than that of the first film as the second film will not generally be thermoformed so localised thinning of the sheet will not occur. The thickness of the second film will generally be from 20 to 150 μm or 160 μm, preferably from 40 or 50 to 90 or 100 μm, more preferably from 50 to 80 μm.

The films may be chosen, if desired, such that they have the same thickness before the first film is thermoformed, or have the same thickness after the first sheet has been thermoformed in order to provide a composition which is encapsulated by a substantially constant thickness of film.

The containers of the present invention generally contain from 5 to 100 g of aqueous composition, especially from 15 to 40 g, depending on their intended use. For example, a dishwashing composition may weigh from 15 g to 20 g, a water-softening composition may weigh from 25 to 35 g, and a laundry composition may weigh from 10 to 40 g, especially 20 to 30 g or 30 to 40 g.

The containers may have any shape achievable by thermoforming. For example they can take the form of a cylinder, cube or cuboid, i.e. a rectangular parallelepiped whose faces are not all equal. In general, because the containers are not rigid, the sides are not planar, but rather are convex. If the container is formed from a thermoformed film and a planar film, the seam between the two films will appear nearer one face of the container rather than the other. Apart from the deformation of the container due to the shrinkage of the film discussed above, deformation may also occur at the stage of manufacture if desired. For example, if the pocket is filled with a gelled composition having a height greater than that of the pocket, the second film will be deformed when placed on top of the pocket. A shaped sealing platen is required to achieve this effect.

In general the maximum dimension of the filled part of the container (excluding any flanges) is 5 cm. For example, a rounded cuboid container may have a length of 1 to 5 cm, especially 3.5 to 4.5 cm, a width of 1.5 to 3.5 cm, especially 2 to 3 cm, and a height of 1 to 2.5 cm, especially 1 to 2 cm, and more especially 1.25 to 1.75 cm.

The container desirably contains an aqueous composition which is a fabric care, surface care or dishwashing composition. Thus, for example, it may be a dishwashing, water-softening, laundry or detergent composition or a rinse aid. In this case the container is preferably suitable for use in a domestic washing machine such as a laundry washing machine or a dishwashing machine. The composition may also be a disinfectant, antibacterial or antiseptic composition intended to be diluted with water before use, or a concentrated refill composition, for example a trigger-type spray as used in domestic situations. Such a composition can simply be added to water already held in the spray container. Examples of surface care compositions are those used to clean, treat or polish a surface. Suitable surfaces are, for example, household surfaces such as worktops, as well as surfaces of sanitary ware, such as sinks, basins and lavatories.

The composition preferably contains greater than 3 wt % free water based on the weight of the aqueous composition, in order to ensure that the container has an attractive appearance. The actual amount of water present in the composition may be in excess of the amount of free water, since the total water content includes water of solvation and water held within a gelled matrix. Free water can be determined by a standard loss-on-drying determination test carried out at 60° C. for 3 hours at 200 mbar (20 kPa). Desirably the composition contains more than 10 wt %, 15 wt %, 20 wt %, 25 wt % or 30 wt % total water, but desirably less than 80 wt % total water, more desirably less than 70 wt %, 60 wt %, 50 wt % or 40 wt % total water. It may, for example, contain from 30 to 65 wt % total water.

The remaining ingredients of the composition depend on the use of the composition. Thus, for example, the compositions may contain surface active agents such as an anionic, nonionic, cationic, amphoteric or zwitterionic surface active agents or mixtures thereof.

Examples of anionic surfactants are straight-chained or branched alkyl sulfates and alkyl polyalkoxylated sulfates, also known as alkyl ether sulfates. Such surfactants may be produced by the sulfation of higher $C_8$-$C_{20}$ fatty alcohols.

Examples of primary alkyl sulfate surfactants are those of formula:

$ROSO_3^-M^+$ wherein R is a linear $C_8$-$C_{20}$ hydrocarbyl group and M is a water-solubilising cation. Preferably R is $C_{10}$-$C_{16}$ alkyl, for example $C_{12}$-$C_{14}$, and M is alkali metal such as lithium, sodium or potassium.

Examples of secondary alkyl sulfate surfactants are those which have the sulfate moiety on a "backbone" of the molecule, for example those of formula:

$CH_2(CH_2)_n(CHOSO_3^-M^+)(CH_2)_mCH_3$ wherein m and n are independently 2 or more, the sum of m+n typically being 6 to 20, for example 9 to 15, and M is a water-solubilising cation such as lithium, sodium or potassium.

Especially preferred secondary alkyl sulfates are the (2,3) alkyl sulfate surfactants of formulae:

$CH_2(CH_2)_x(CHOSO_3^-M^+)CH_3$ and $CH_3(CH_2)_x(CHOSO_3M^+)CH_2CH_3$ for the 2-sulfate and 3-sulfate, respectively. In these formulae x is at least 4, for example 6 to 20, preferably 10 to 16. M is a cation, such as an alkali metal, for example lithium, sodium or potassium.

Examples of alkoxylated alkyl sulfates are ethoxylated alkyl sulfates of the formula:

$RO(C_2H_4O)_nSO_3^-M^+$ wherein R is a $C_8$-$C_{20}$ alkyl group, preferably $C_{10}$-$C_{18}$ such as a $C_{12}$-$C_{16}$, n is at least 1, for example from 1 to 20, preferably 1 to 15, especially 1 to 6, and M is a salt-forming cation such as lithium, sodium, potassium, ammonium, alkylammonium or alkanolammonium. These compounds can provide especially desirable fabric cleaning performance benefits when used in combination with alkyl sulfates.

The alkyl sulfates and alkyl ether sulfates will generally be used in the form of mixtures comprising varying alkyl chain lengths and, if present, varying degrees of alkoxylation.

Other anionic surfactants which may be employed are salts of fatty acids, for example $C_8$-$C_{18}$ fatty acids, especially the sodium, potassium or alkanolamine salts, and alkyl, for example $C_8$-$C_{18}$, benzene sulfonates.

Examples of nonionic surfactants are fatty acid alkoxylates, such as fatty acid ethoxylates, especially those of formula:

$R(C_2H_4O)_nOH$ wherein R is a straight or branched $C_8$-$C_{16}$ alkyl group, preferably a $C_9$-$C_{15}$, for example $C_{10}$-$C_{14}$ or $C_{12}$-$C_{14}$, alkyl group and n is at least 1, for example from 1 to 16, preferably 2 to 12, more preferably 3 to 10.

The alkoxylated fatty alcohol nonionic surfactant will frequently have a hydrophilic-lipophilic balance (HLB) which ranges from 3 to 17, more preferably from 6 to 15, most preferably from 10 to 15.

Examples of fatty alcohol ethoxylates are those made from alcohols of 12 to 15 carbon atoms and which contain about 7 moles of ethylene oxide. Such materials are commercially marketed under the trademarks Neodol 25-7 and Neodol 23-6.5 by Shell Chemical Company. Other useful Neodols include Neodol 1-5, an ethoxylated fatty alcohol averaging 11 carbon atoms in its alkyl chain with about 5 moles of ethylene oxide; Neodol 23-9, an ethoxylated primary $C_{12}$-$C_{13}$ alcohol having about 9 moles of ethylene oxide; and Neodol 91-10, an ethoxylated $C_9$-$C_{11}$ primary alcohol having about 10 moles of ethylene oxide.

Alcohol ethoxylates of this type have also been marketed by Shell Chemical Company under the Dobanol trademark. Dobanol 91-5 is an ethoxylated $C_9$-$C_{11}$ fatty alcohol with an average of 5 moles ethylene oxide and Dobanol 25-7 is an ethoxylated $C_{12}$-$C_{15}$ fatty alcohol with an average of 7 moles of ethylene oxide per mole of fatty alcohol.

Other examples of suitable ethoxylated alcohol nonionic surfactants include Tergitol 15-S-7 and Tergitol 15-S-9, both of which are linear secondary alcohol ethoxylates available from Union Carbide Corporation. Tergitol 15-S-7 is a mixed ethoxylated product of a $C_{11}$-$C_{15}$ linear secondary alkanol with 7 moles of ethylene oxide and Tergitol 15-S-9 is the same but with 9 moles of ethylene oxide.

Other suitable alcohol ethoxylated nonionic surfactants are Neodol 45-11, which is a similar ethylene oxide condensation products of a fatty alcohol having 14-15 carbon atoms and the number of ethylene oxide groups per mole being about 11. Such products are also available from Shell Chemical Company.

Further nonionic surfactants are, for example, $C_{10}$-$C_{18}$ alkyl polyglycosides, such as $C_{12}$-$C_{16}$ alkyl polyglycosides, especially the polyglucosides. These are especially useful when high foaming compositions are desired. Further surfactants are polyhydroxy fatty acid amides, such as $C_{10}$-$C_{18}$ N-(3-methoxypropyl)glycamides and ethylene oxide-propylene oxide block polymers of the Pluronic type.

Examples of cationic surfactants are those of the quaternary ammonium type. Examples of amphoteric surfactants are $C_{10}$-$C_{18}$ amine oxides and the $C_{12}$-$C_{18}$ betaines and sulfobetaines.

The total content of surfactants in the composition is desirably 0.1 to 95 wt %, especially 60 or 75 to 90 wt %.

The total content of surfactants in the laundry or detergent composition is desirably 60 to 95 wt %, especially 75 to 90 wt %. Desirably, especially in a laundry composition, an anionic surfactant is present in an amount of 50 to 75 wt %, a nonionic surfactant is present in an amount of 5 to 20 wt %, and/or a cationic surfactant is present in an amount of from 0 to 10 wt % and/or a amphoteric surfactant may be present in an amount of from 0 to 10 wt %. Desirably, in a dishwashing composition, the anionic surfactant is present in an amount of from 0.1 to 50 wt %, a non-ionic surfactant is present in an amount of 0.5 to 20 wt % and/or a cationic surfactant is present in an amount of from 1 to 15 wt %. These amounts are based On the solids content of the composition, i.e. excluding any water or solvent which may be present.

The compositions, particularly when used as laundry washing or dishwashing compositions, may also comprise enzymes, such as protease, lipase, amylase, cellulase and peroxidase enzymes. Such enzymes are commercially available and sold, for example, under the registered trade marks Esperese, Alcalase, Savinase, Termamyl, Lipolase and Celluzyme by Nova Industries A/S and Maxatasc by International Biosynthetics, Inc. Desirably the enzymes are present in the composition in an amount of from 0.5 to 3 wt %, especially 1 to 2 wt %.

Dishwasher compositions usually comprise a detergency builder. Suitable builders are alkali metal or ammonium phosphates, polyphosphates, phosphonates, polyphosphonates, carbonates, bicarbonates borates, polyhydroxysulfonates, polyacetates, carboxylates and polycarboxylates such as citrates. The builder is desirably present in an amount of up to 90 wt %, preferably 15 to 90 wt %, more preferably 15 to 75 wt %, relative to the total content of the composition.

Further details of suitable components are given in, for example, EP-A-694,059, EP-A-518720 and WO 99/06522.

The compositions may, if desired, comprise a thickening agent or gelling agent. Suitable thickeners are polyacrylate polymers such as those sold under the trade mark CARBOPOL, or the trade mark ACUSOL by Rohm and Haas Company. Other suitable thickeners are xanthan gums. The thickener, if present, is generally present in an amount of from 0.2 to 4 wt %, especially 0.5 to 2 wt %.

The compositions can also optionally comprise one or more additional ingredients. These include conventional detergent composition components such as further surfactants, bleaches, bleach enhancing agents, builders, suds boosters or suds suppressors, anti-tarnish and anti-corrosion agents, organic solvents, co-solvents, phase stabilisers, emulsifying agents, preservatives, soil suspending agents, soil release agents, germicides, phosphates such as sodium tripolyphosphate or potassium tripolyphosphate, pH adjusting agents or buffers, non-builder alkalinity sources, chelating agents, clays such as smectite clays, enzyme stabilizers, anti-limescale agents, colourants, dyes, hydrotropes, dye transfer inhibiting agents, brighteners and perfumes. If used, such optional ingredients will generally constitute no more than 10 wt %, for example from 1 to 6 wt %, of the total weight of the compositions.

The builders counteract the effects of calcium, or other ion, water hardness encountered during laundering or bleaching use of the compositions herein. Examples of such materials are citrate, succinate, malonate, carboxymethyl succinate, carboxylate, polycarboxylate and polyacetyl carboxylate salts, for example with alkali metal or alkaline earth metal cations, or the corresponding free acids. Specific examples are sodium, potassium and lithium salts of oxydisuccinic acid, mellitic acid, benzene polycarboxylic acids, $C_{10}$-$C_{22}$ fatty acids and citric acid. Other examples are organic phosphonate type sequestering agents such as those sold by Monsanto under the trade mark Dequest and alkyl hydroxy phosphonates. Citrate salts and $C_{12}$-$C_{18}$ fatty acid soaps are preferred.

Other suitable builders are polymers and copolymers known to have builder properties. For example, such materials include appropriate polyacrylic acid, polymaleic acid, and polyacrylic/polymaleic and copolymers and their salts, such as those sold by BASF under the trade mark Sokalan.

The builders generally constitute from 0 to 3 wt %, more preferably from 0.1 to 1 wt %, by weight of the compositions.

Compositions which comprise an enzyme may optionally contain materials which maintain the stability of the enzyme. Such enzyme stabilizers include, for example, polyols such as propylene glycol, boric acid and borax. Combinations of these enzyme stabilizers may also be employed. If utilized, the enzyme stabilizers generally constitute from 0.1 to 1 wt % of the compositions.

The compositions may optionally comprise materials which serve as phase stabilizers and/or co-solvents. Example are $C_1$-$C_3$ alcohols or diols such as methanol, ethanol, propanol and 1,2-propanediol. $C_1$-$C_3$ alkanolamines such as mono-, di- and triethanolamines and monoisopropanolamine can also be used, by themselves or in combination with the alcohols. The phase stabilizers and/or co-solvents can, for example, constitute 0 to 1 wt %, preferably 0.1 to 0.5 wt %, of the composition.

The compositions may optionally comprise components which adjust or maintain the pH of the compositions at optimum levels. Examples of pH adjusting agents are NaOH and citric acid. The pH may be from, for example, 1 to 13, such as 8 to 11 depending on the nature of the composition. For example, a dishwashing composition desirably has a pH of 8 to 11, a laundry composition has a pH of 7 to 9, and a water-softening composition has a pH of 7 to 9.

The invention claimed is:

1. A thermoforming machine,
   wherein said thermoforming machine is a horizontal intermittent motion thermoforming machine and comprises a mould;
   wherein said mould contains a plurality of pocket forming cavities in a 2-dimensional array;
   wherein said cavities are each defined by side walls and a base, and each cavity is surrounded by a planar surface of the mould on all sides in which the shortest dimension of the planar surface between two adjacent cavities is at least 3 mm and between an edge of the mould and the closest cavity is at least 1.5 mm, and in which the cavities are positioned in the array in an arrangement providing a plurality of continuous strips of uninterrupted planar surface of the mould from a leading to a trailing edge of the mould;
   wherein the cavities have bottom corners, formed where said side walls meet said base, which are rounded, and the cavities have edges, formed where said side walls meet an upper surface of the mould, which are rounded;
   wherein the thermoforming machine is configured to be able to draw a web of water-soluble film down into the cavities;
   wherein the cavities have vacuum release bores;
   wherein the thermoforming machine comprises a plurality of supports for the web of water-soluble film;

wherein the plurality of supports are rails with leading ends comprising a smooth cam surface; and wherein the thermoforming machine further comprises grippers attached to a plurality of driven chains and configured to provide tension to the web of water-soluble film.

2. The thermoforming machine as claimed in claim 1, wherein the plurality of supports are arranged along at least some of said plurality of continuous strips of uninterrupted planar surface of said mould.

3. The thermoforming machine as claimed in claim 2, wherein said plurality of support means are arranged along at least every other one of said plurality of continuous strips.

4. The thermoforming machine as claimed in claim 3, wherein said plurality of support means are arranged along each of said plurality of continuous strips.

5. The thermoforming machine as claimed in claim 1, wherein the cavities have air bores which communicate with air channels in the mould beneath the cavities.

\* \* \* \* \*